(12) United States Patent
Gan et al.

(10) Patent No.: US 7,013,139 B1
(45) Date of Patent: Mar. 14, 2006

(54) HLR DATA MIGRATION

(75) Inventors: Hock Chye Gan, Potters Bar (GB); David E Jones, Maidenhead (GB); Stephen Bird, Yateley (GB); Robert Lucas, Maidenhead (GB); Jaswant Virdee, Langley (GB); Ricky Kaura, Ickenham (GB)

(73) Assignee: Nortel Networks Limited, St. Laurent (CA)

( * ) Notice: Subject to any disclaimer, the term of this patent is extended or adjusted under 35 U.S.C. 154(b) by 606 days.

(21) Appl. No.: 09/286,087

(22) Filed: Apr. 2, 1999

(51) Int. Cl.
*H04Q 7/20* (2006.01)

(52) U.S. Cl. .................. 455/432.3; 455/435.1

(58) Field of Classification Search .......... 455/433, 455/432, 445, 422, 435, 403, 524, 525, 560; 379/230, 219
See application file for complete search history.

(56) References Cited

U.S. PATENT DOCUMENTS

| | | | | |
|---|---|---|---|---|
| 5,561,854 A | | 10/1996 | Antic et al. ................ | 455/56.1 |
| 5,623,532 A | * | 4/1997 | Houde et al. ................ | 455/445 |
| 5,878,348 A | * | 3/1999 | Foti ........................ | 455/433 X |
| 5,953,662 A | * | 9/1999 | Lindquist et al. ........... | 455/433 |
| 5,956,637 A | * | 9/1999 | Ericsson et al. ............ | 455/433 X |
| 5,982,757 A | * | 11/1999 | Curtis et al. ............. | 455/435 X |
| 6,021,327 A | * | 2/2000 | Nguyen et al. ............. | 455/433 |
| 6,115,463 A | * | 9/2000 | Coulombe et al. .......... | 379/230 |
| 6,138,017 A | * | 10/2000 | Price et al. ................ | 455/433 |

* cited by examiner

*Primary Examiner*—Nay Maung
*Assistant Examiner*—Philip J Sobutka
(74) *Attorney, Agent, or Firm*—Barnes & Thornburg LLP

(57) ABSTRACT

Typically data migration between HLR nodes is implemented by suspending operation of the HLR function in a mobile communications network while the data is transferred. This operation inevitably results in considerable network disruption. The present invention provides a method of on-line active data migration in which a subscriber diversion is implemented before subscriber data is sequentially transferred from one HLR node to another. The diversion redirects particular subscriber transactions from the second to the first HLR nodes if the subscriber has not been migrated from the first HLR node. The method allows the transfer to be implemented while the network HLR function remains on-line.

15 Claims, 4 Drawing Sheets

HLR DATA MIGRATION

FIELD OF THE INVENTION

The present invention relates to data migration between on-line databases and is particularly but not exclusively concerned with data migration between wireless networks home location registers (HLR's).

PRIOR ART

A number of cell communication systems are currently being installed to provide communications facilities to mobile terminals. In such systems, mobile terminals are served by base stations by a radio or air link, each base station defining a system cell. In order that a subscriber may be identified as an authorised system user and located so as to receive calls or other system services, the system is provided with a central database containing subscriber information which can be accessed as required. In the standardised European system commonly referred to as the GSM system, this central store is known as the home location register (HLR).

The HLR stores subscriber and system data including feature information, call forwarding numbers and current location area (the local Mobile Switching Centre (MSC) and visitors location register (VLR)). The MSC requests a subscriber's data to be downloaded from the central HLR into the local VLR when that subscriber moves into the local area. This data enables the MSC to determine features subscribed to for example and other subscriber information As the number of subscribers increases, a single HLR node or server is often insufficient to maintain subscriber data necessitating the balancing of data and/or transaction capacity between additional HLR nodes. Furthermore, as the quality (including continuity) of service demanded increases, backup facilities are required to restore and maintain continuity of service in case of HLR node breakdown. In each case one or more additional HLR nodes is required, however difficulties arise when active subscriber data is to be transferred from one HLR node to another either for load balancing between the HLR nodes or to transfer active subscriber data from a backup HLR node to the normal service HLR node after its recovery from a failure. In both cases normal network subscriber service is suspended while the data is transferred as the active subscriber data cannot be accessed while there is no single and settled HLR address to which this data corresponds. The process of active data transfer typically involves suspending normal service and hence subscriber data transactions, making a backup HLR database copy onto tape or similar of the current active subscriber data on the active data HLR node, and manually transporting the backup copy to a second HLR node, installing the subscriber data onto the second HLR node and then restoring normal service using the second HLR node. This process can take several hours and represents a significant disruption of normal service to subscribers.

Such service discontinuity represents a large revenue loss particularly as the number of network subscribers increases.

OBJECT OF THE INVENTION

It is an object of the present invention to provide an improved method of HLR data transfer which overcomes at least some of the above mentioned problems.

SUMMARY OF THE INVENTION

In a first aspect the present invention provides a method of migrating subscriber data associated with a plurality of subscriber identities from a first Home Location Register (HLR) node to a second HLR node, said HLR nodes being connected by a fixed network, the method comprising the steps of:
  sequentially for each subscriber to be migrated transferring active subscriber data associated with said identity from said first node to said second node.

Preferably the method comprises the further step of:
  implementing a diversion function such that subscriber data update and request transactions addressed for a subscriber identity arriving at one said node where the subscriber data is not active are forwarded to the other node.

Preferably the diversion function is implemented such that subscriber data update and request transactions addressed for a subscriber identity arriving at said second node are diverted to said first node if said subscriber identity and associated subscriber data is not active in said second node;
  and wherein subscriber data update and request transactions addressed for said first node are re-routed by said network to said second node.

Preferably said transfer comprises:
  changing the state of said subscriber data in said first HLR from active;
  copying said subscriber data from said first to said second HLR;
  deleting said subscriber data from said first HLR; and
  changing the state of said subscriber data in said second HLR to active.

Alternatively said HLR nodes are arranged into a mated pair such that said active subscriber data is distributed across said nodes and wherein each node comprises a diversion function such that subscriber data update and request transactions addressed for a subscriber identity arriving at one said HLR node where the subscriber data is not active are forwarded to the other said HLR node.

Preferably said transfer comprises:
  changing the state of said subscriber data in said first node from active to standby and changing the state of said subscriber data in said second node from standby to active.

Preferably said transfer comprises the steps of:
  disable said subscriber data in said first node;
  copy said subscriber data from said first node to said second node;
  enable said subscriber data in said second node.

Preferably said disable step comprises changing the state of said subscriber data in said first node from active to standby.

Preferably said enable step comprises changing the state of said subscriber data in said second node from standby to active.

Preferably subscriber data update and request transactions addressed for said first HLR are re-routed by said network to said second HLR.

BRIEF DESCRIPTION OF THE DRAWINGS

In order to gain a greater understanding of the invention, preferred embodiments of the invention will now be described with reference to the following drawings, by way of example only and without intending to be limited, in which.

DESCRIPTION OF THE PREFERRED EMBODIMENTS

Figure 1:
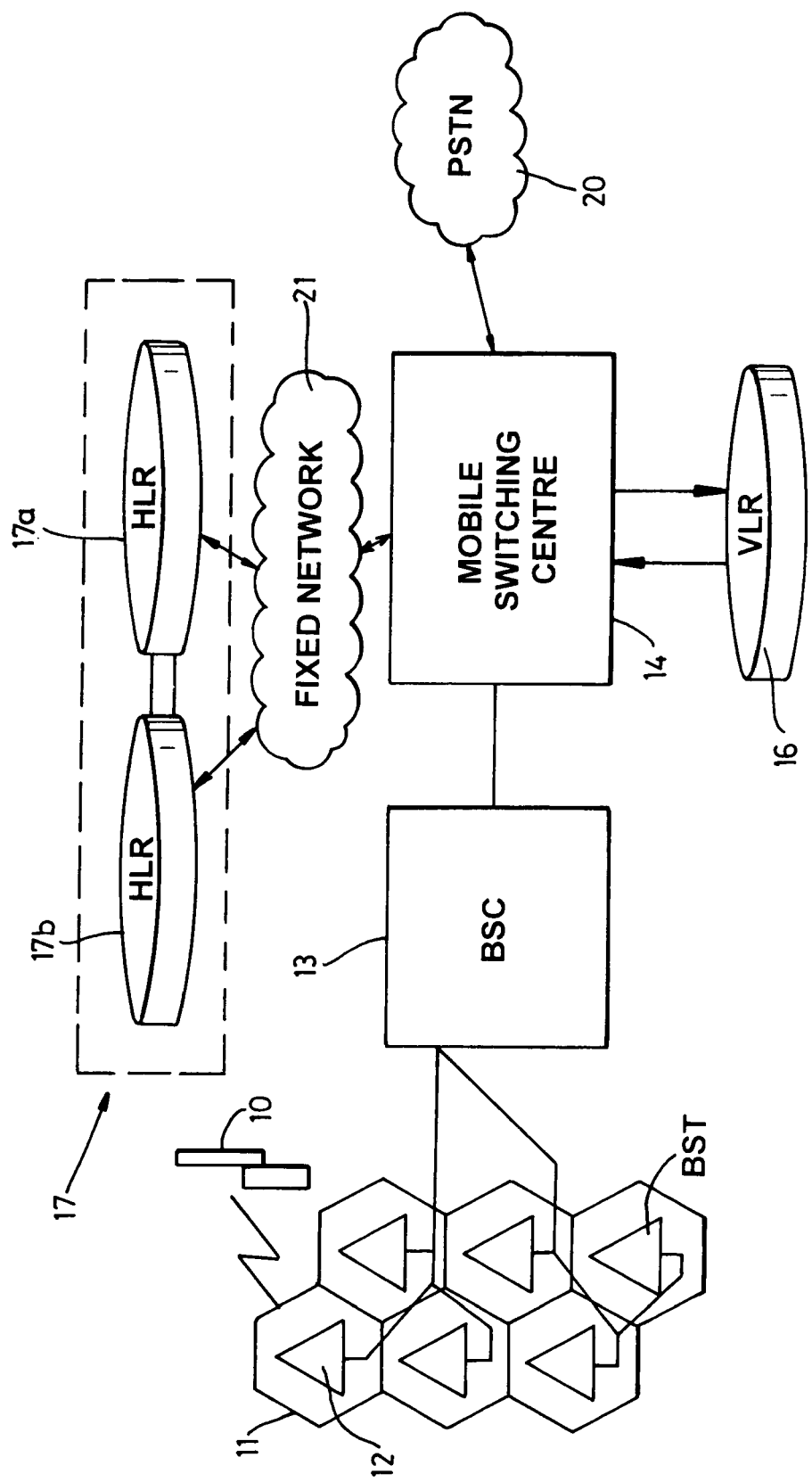
FIG. 1 is a schematic diagram of a mobile communications system.

Referring to FIG. 1, there is depicted in highly schematic form part of a mobile cellular communications network or system. The service area of the network is subdivided into a plurality of contiguous cells 11 in each of which mobiles 10 are serviced via a respective base station 12. Operation of a group of base stations 12 is controlled by a base station controller 13 and, in turn, a number of base station controllers are serviced by a mobile switching centre (MSC) 14. Within this arrangement, the mobile switching centre 14 may service, via the base station controller 13 and the base stations 12, typically over 100 individual cells 11. Information relating to the mobiles 10 within the service area of the mobile switching centre 14 is stored in a visitors location register (VLR) or database 16 associated with the mobile switching centre. The network will in practice also be connected to other networks 7 such as the public switched telephone network (PSTN) 20.

The network also incorporates a master database 17 of subscriber information known as the home location register (HLR). When a mobile terminal 10 enters the service area of an MSC 14, it registers with that MSC. As part of the registration procedure, information or data relating to that mobile subscriber is received by the MSC 14 from the home location register 17 and stored in the visitors location register (VLR) 16. In this way, the system is constantly updated with the current location of each mobile terminal 10 so that calls to that mobile can be routed to the correct mobile switching centre 14.

Figure 2:
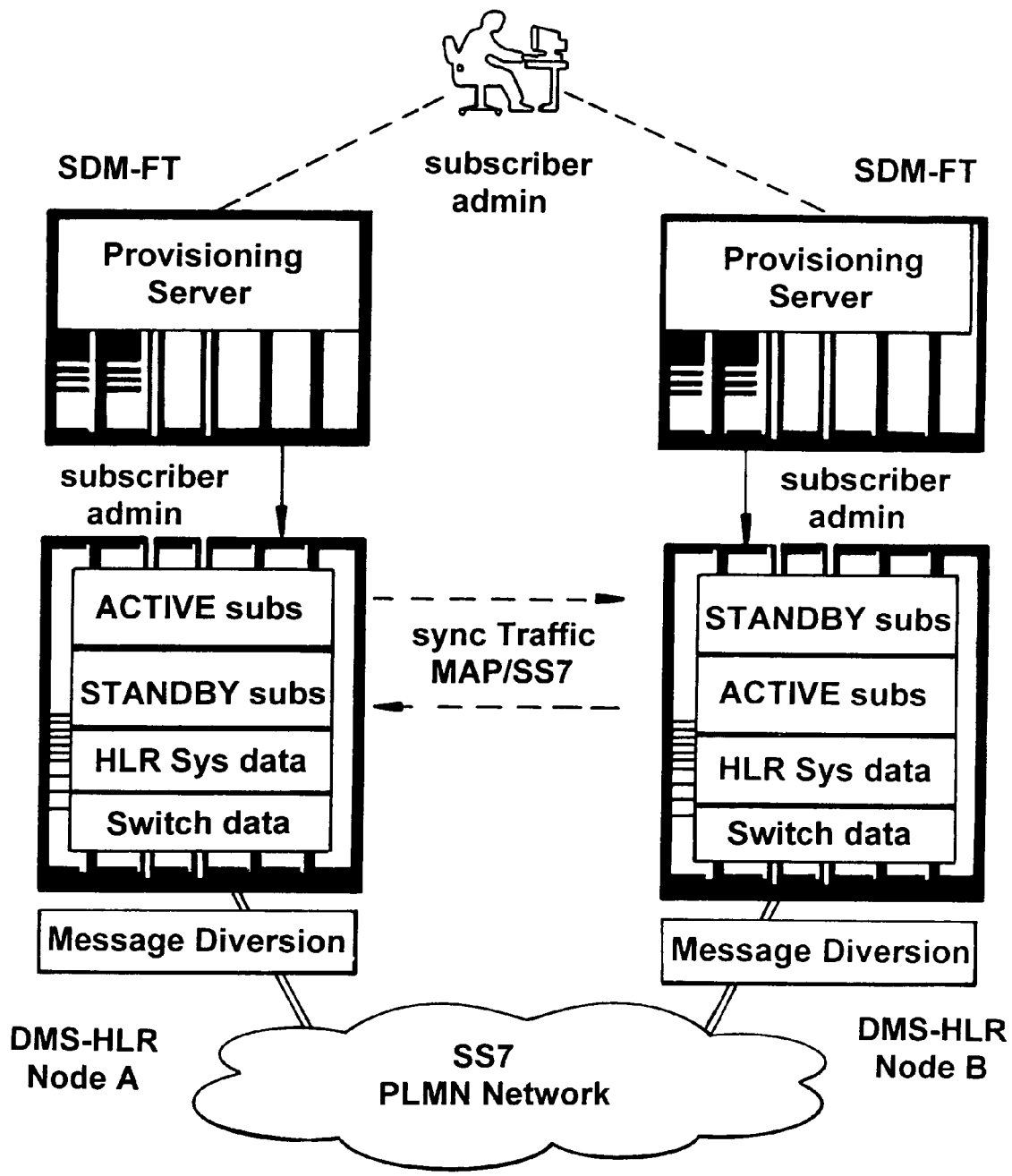
FIG. 2 is a schematic diagram of a mated pair HLR standby arrangement of the invention.

Referring to FIGS. 1 and 2, the preferred embodiment HLR 17 comprises two nodes A and B arranged into a mated pair in which each node supports for example half the active subscriber data as well as standby subscriber data corresponding to active data on the other node. Active subscriber data is accessed by the MSC via a fixed network 21 which is connected between the HLR nodes A and B and the MSC 14. Preferably the fixed network 21 is a SS7 network. Every time active subscriber data is changed on one of the nodes A or B, the corresponding standby data on the other node B or A is updated. The mated pair arrangement also comprises automatic transaction diversion such that HLR transactions such as subscriber data updates and requests addressed to one of the nodes A or B are diverted or re-addressed to the other node B or A if the subscriber data is not active in the first addressed node.

The use of standby subscriber data which substantially duplicates active subscriber data allows for the near instantaneous and full recovery of the HLR function within the network should one of the HLR nodes A or B fail through earthquake, fire or severe equipment failure for example. Upon failure of node B for example, HLR transactions from the MSC 14 such as subscriber data requests or updates are re-routed by the network 21 to node A which is reconfigured to support all the active subscriber data by converting its standby data to active data. This is usually done by changing a field in the subscriber data on the node B from standby to active state.

The use of this mated pair arrangement increases the reliability of the HLR in the event of failure of one of the nodes as half the active subscriber data (in this example) is already running on the remaining node, requiring only half the standby data to be converted to active data. The arrangement also reduces the level of processing required on one HLR node in normal operation as the active subscriber data is distributed across two nodes A and B, and hence reduces the average time for processing subscriber data request and update transactions.

Previous subscriber data backup facilities typically involved making periodic backup tapes of the HLR database so that in the event of a failure in the HLR, this database could then be installed on another server or node and the network restored using this server. However this approach took a considerable period of time to implement which resulted in a considerable interruption of service to subscribers of the network. Furthermore, data was inevitably lost between the last backup and the HLR failure.

While the preferred mated pair arrangement utilises two HLR nodes with substantially equally shared active subscriber data, in alternative embodiments other complementary proportions of active and standby subscriber data can be distributed across the two nodes The balancing of active subscribers between the two nodes can be based on transaction capacity as well as storage capacity for example.

The invention provides a method of online active data migration which is used upon recovery or restoration of an HLR node following its failure or maintenance. Upon repair or replacement of node B for example, it is desirable to re-establish the original mated pair arrangement as described above in which active subscriber data is shared across the two nodes A and B. Online data migration might also be required for example in HLR load balancing where some active subscriber data are transferred from node A in FIG. 2 to node B—for example where a smaller number of high use subscribers are handled by one node and a larger number of low use subscribers are handled by the other. In a further example, online subscriber data may be transferred to a replacement HLR node upon upgrading of the existing and now possibly obsolete old HLR node. In all these cases it is desirable to transfer the subscriber data while the HLR function remains online to minimise subscriber service interruption.

Existing subscriber data migration methods typically involved suspending operation of the HLR function in the network and copying subscriber data from one HLR node to a second HLR node after which operation of the HLR is re-established utilising the second HLR node. This type of data transfer method requires suspension of HLR function and inevitably results in interruption of subscriber service in the network.

Figure 3:
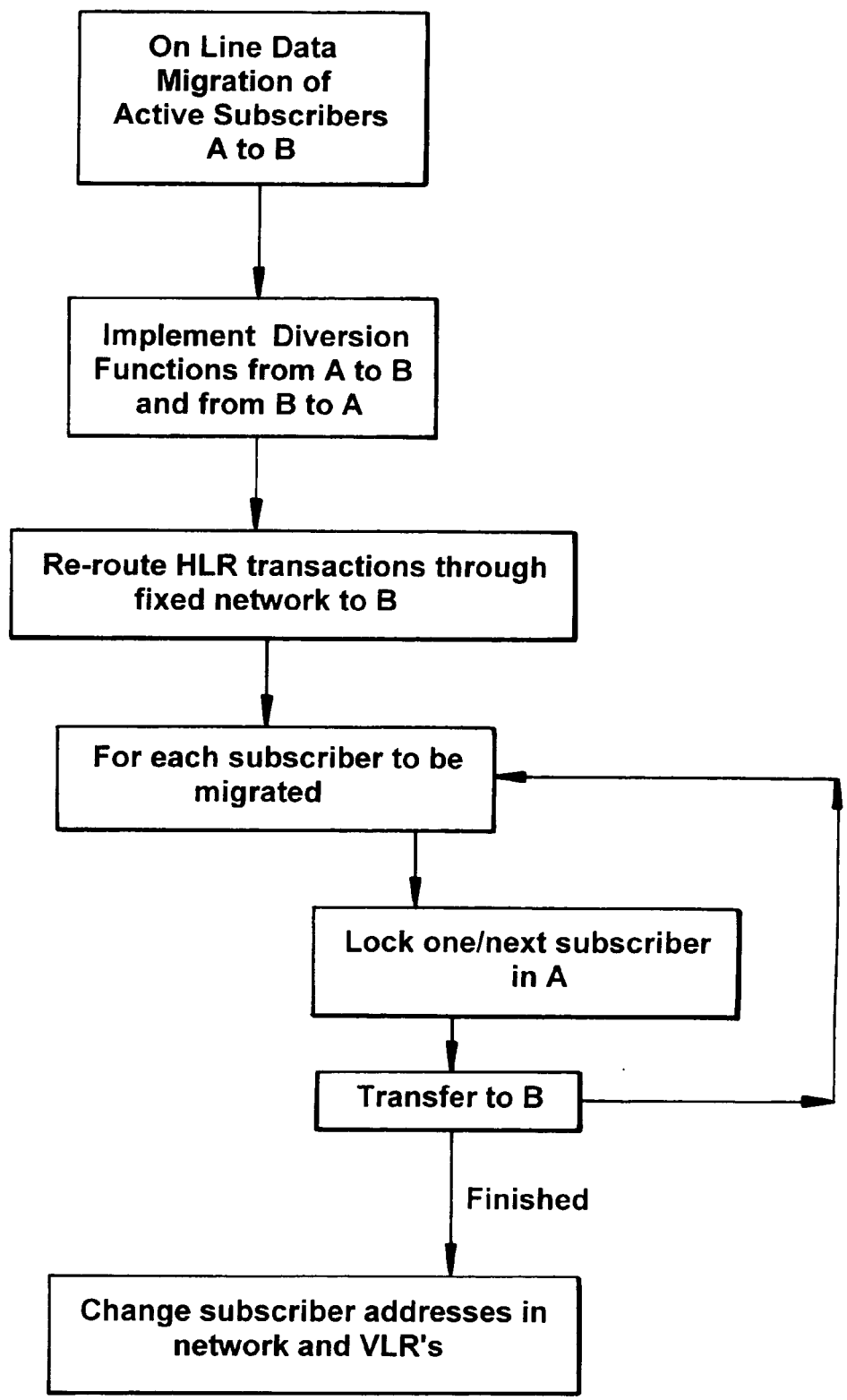
FIG. 3 is a flow chart of the data migration method of the invention.

The subscriber data migration method of the invention is described with reference to FIGS. 1, 2 and 3, and facilitates on-line active subscriber data migration which maintains the network HLR function whilst the active subscriber data is being transferred. In the case of restoration of node B following its failure for example, each active subscriber data to be migrated is sequentially locked and transferred from node A to node B until, in the above described mated pair arrangement, approximately half the active subscriber data is located on and handled by node B, the other half of the active subscriber data remaining on node A. Node B is installed with subscriber data copied from node A. A diversion function is implemented on each node A and B such that subscriber update and request transactions addressed to node B for subscriber data which is not active in node B are diverted to node A. Similarly, transactions addressed to node A for subscriber data which is not active in node A are diverted to node B. The network 21 is instructed to re-route HLR transactions to node B. Then in turn each active subscriber data to be transferred is locked or disabled so that HLR subscriber update and request transactions for that subscriber cannot be actioned. This is achieved by changing the state field of the subscriber data in node A from active to standby such that upon receipt of any HLR transactions, node A cannot process them as the required active subscriber data cannot be found. The active subscriber data is then transferred from node A to node B by changing the state of the subscriber data in node B from standby to active. If the subscriber data has changed since it was copied to node B, it is updated before the state of the data in node B is changed to active. Any HLR transactions diverted from node A or addressed to node B for the subscriber data in question can then be handled by node B. This locking and transferring process is then implemented on the next active subscriber data to be migrated.

In an alternative embodiment, node B is not first installed with subscriber data copied from node A. Transfer then involves first changing the state of the data in node A to standby, copying the subscriber data to node B, then changing the state of the data in node B to active.

The sequential data migration of the invention minimises disruption to the network HLR function as at any one time, only one subscriber is disabled and this is for a relatively short time as the transfer of one subscriber is considerably faster than that of all subscriber data as in previous methods.

When active data associated with a particular subscriber in node A is locked or disabled by changing its state to standby, subscriber data request and update transactions received from the MSC 14 for that subscriber are disabled. If the MSC attempts to request subscriber data for that particular subscriber for downloading into its VLR for example (a subscriber data request transaction), or the MSC attempts to update subscriber data informing the HLR of features supported by the local VLR for example (a subscriber data update transaction); the active subscriber data will not be found in node A and the transactions will be diverted to the node B where, initially, it will also not be found and the transaction will fail. The MSC 14 is configured to attempt the transaction a predetermined number of times should it fail, so that following migration of that subscriber data to node B, the transaction will eventually be completed using that node. The likelihood of an attempted transaction for a particular subscriber during its migration period is small, and as the migration time is short, the perceived disruption to service by that subscriber will be insignificant. Other subscribers will be unaffected at that time.

Each active subscriber data is transferred one at a time in this way so that eventually half the active subscriber data will be re-established on node B. While data migration has been described in relation to the migration of one subscriber at a time from node A to node B, two or more subscribers could be migrated at a time. This will ensure a faster migration process but may incur greater interruption to subscriber service and more complex error handling.

Following completion of subscriber data migration, the network 21 and VLR's are updated with all the subscribers new addresses. The operator may then switch off the diversions previously set up.

While the method has been described with respect to a mated pair of HLR nodes, the method can also be applied to other situations where active subscriber data is to be migrated from one HLR node to another—for example to upgrade an old HLR node with a replacement HLR node. In this case, a separate diversion must be implemented from at least one of the nodes to the other, for example from the replacement node to the old node. The network is then reconfigured to first address HLR transactions to the replacement node. Once the diversion function and network 21 re-routing is in place, HLR transactions reaching the replacement node and requiring active subscriber data which is not present in the replacement node will be diverted to the old node. Active subscriber data is then sequentially locked and transferred from the old node to the replacement node. Transfer includes changing the state of the subscriber data in the old node from active (to inactive for example), copying the data from the old node to the replacement node, deleting it from the old node, and changing the state of the data in the replacement node to active.

Figure 4:
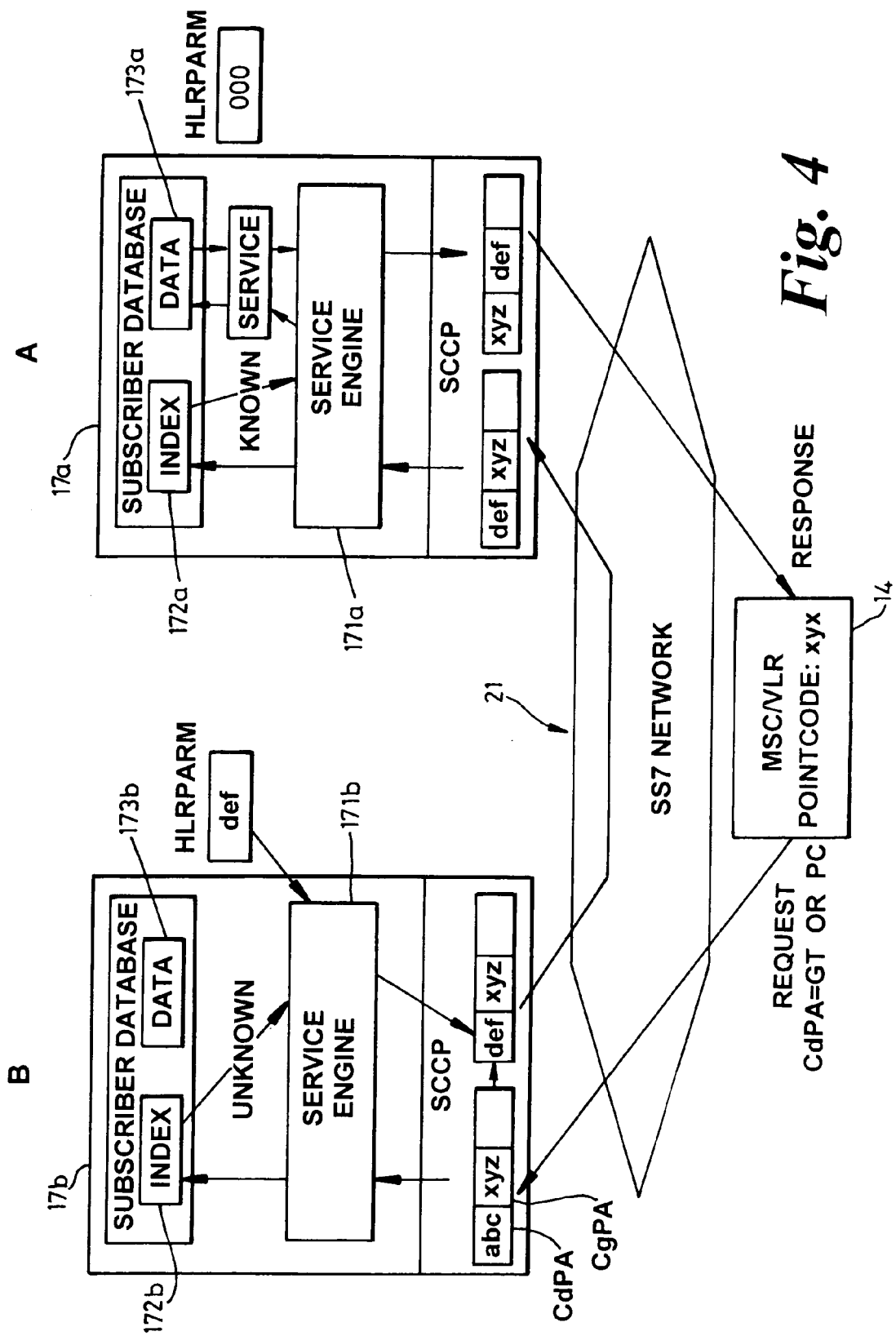
FIG. 4 illustrates the subscriber transaction processing between the mobile switching centre and the mated pair HLR arrangement of the system of FIG. 2.

Referring now to FIG. 4, this illustrates in more detail the communications paths between the mobile network MSC 14 and the two HLR nodes A and B. Communications is effected across a fixed network 21 which typically employs an SS7 signalling protocol in which each system entity is allocated a unique point code or party address which is used for controlling message routing. In the arrangement shown in FIG. 1 following failure of node B, all requests for subscriber data or updated subscriber data from the MSC 14 are allocated the point code (xyz) of node A which provides the HLR function for all subscribers. Upon restoration of node B, subscriber data from node A is copied to node B such that node B contains standby subscriber data. The network is reconfigured to route all HLR subscriber data request and update transactions to node B which initially contains no active subscriber data. Thus, all requests for subscriber data or updated subscriber data from the MSC 14 are allocated the point code (abc) of node B and are consequently routed to that node for processing. The point code (xyz) of the sending entity, the MSC 14 is also included in the request/update transaction. Within node B, a service engine 171b determines from an index 172b provided as part of the subscriber database whether or not the subscriber to whom the request relates is active with that node. This is determined from a state field which describes subscriber data as either standby or active. If the subscriber data is active, the relevant data is retrieved from or updated in the subscriber data 173b and is processed by the service engine which controls routing of responses to the MSC 14 using the point code (xyz) of the MSC.

If however the subscriber data is found to be standby in the index 172b, the service engine diverts the HLR transaction via the network 21 to node A using the point code (def) of that node. When the transaction is received by node A, its service engine determines from index 172a whether or not the subscriber to whom the transaction relates is active with node A. The subscriber will be located in node A if that subscriber data has not been migrated from node A to node B.

As each subscriber data is migrated from node A to node B, the corresponding state index entry in index 172a will be changed from active to standby such that any requests for migrated subscriber data directed to node A will be diverted to node B.

In the preferred arrangement subscriber transactions are re-routed by the network to the restored node B before migration begins as this reduces the processing demands on node A which initially contains all the active subscriber data and so will be handling all of the subscriber HLR transactions. Initially then, node B contains none of the active subscriber data and so will be handling most of the diversions from one node to another. The proportion of diversions and transactions handled by each node will even out as the migration process continues. This spreading of processing load improves the efficiency of the migration process. While this is the preferred arrangement, subscriber transactions may be re-routed by the network after migration has been completed.

The foregoing describes the invention including preferred forms thereof. Alterations and modifications as will be obvious to those skilled in the art are intended to be incorporated within the scope hereof.

The invention claimed is:

1. A method of migrating subscriber data associated with a plurality of subscriber identities from a first Home Location Register (HLR) node to a second HLR node, said HLR nodes being arranged such that subscriber data is distributed between said nodes, each node supporting some subscriber data as active data and some subscriber data as standby data, said standby data of each node corresponding to some active subscriber data of the other node, said nodes being connected by a fixed network, wherein, for each subscriber data associated with a subscriber identity or a small group of subscriber identities to be migrated from said first HLR node to said second HLR node, the method comprises the steps of:
   A. at said first HLR node, changing a state of said subscriber data from active to standby; and
   B. transferring said subscriber data from said first HLR node to said second HLR node by way of changing at said second HLR node the state of the subscriber data from standby to active,
   wherein active data of the first HLR node which is not to be migrated or is to be migrated but has not yet been migrated is maintained as active while said subscriber data currently being migrated is processed according to steps A and B.

2. A method of migrating subscriber data associated with a plurality of subscriber identifies from a first Home Location Register (HLR) node to a second HLR node, said HLR nodes being connected by a fixed network, the method comprising the steps of:
   copying the subscriber data associated with said plurality of subscriber identities from said first HLR node to said second HLR node;
   and, for each subscriber data associated with a subscriber identity or a small group of subscriber identities to be migrated from said first HLR node to said second HLR node, the method comprises the further steps of:
   A. at said first HLR node, changing a state of said subscriber data from active to standby; and
   B. transferring said subscriber data from said first HLR node to said second HLR node by way of changing at said second HLR node the state of the subscriber data from standby to active,
   wherein active data of the first HLR node which is not to be migrated or is to be migrated but has not yet been migrated is maintained as active while said subscriber data currently being migrated is processed according to steps A and B.

3. A method of migrating subscriber data associated with a plurality of subscriber identities from a first Home Location Register (HLR) node to a second HLR node, said HLR nodes being connected by a fixed network, for each subscriber data associated with a subscriber identity or a small group of subscriber identities to be migrated from said first HLR node to said second HLR node, the method comprises the steps of:
   A. at said first HLR node, changing a state of said subscriber data from active to standby;
   B. copying from said first HLR node said subscriber data associated with said subscriber identity or said small group of subscriber identities to said second HLR node; and
   C. at said second HLR node, changing the state of said subscriber data from standby to active,
   wherein active data of the first HLR node which is not to be migrated or is to be migrated but has not yet been migrated is maintained as active while said subscriber data currently being migrated is processed according to steps A to C.

4. A method as claimed in any one of claims 1, 2 or 3, comprising the further step of:
   implementing a diversion function such that any of a subscriber data update and a subscriber request transaction addressed for a subscriber identity arriving at one said node where the subscriber data is not active is forwarded to the other node.

5. A method as claimed in claim 4 wherein the diversion function is implemented such that any one of a subscriber data update and a subscriber request transaction addressed for a subscriber identity arriving at said second node is diverted to said first node if said subscriber identity and associated subscriber data is not active in said second node; and wherein any one of a subscriber data update and a subscriber request transaction addressed for said first node is re-routed by said network to said second node.

6. A method as claimed in claim 4 when dependent on claims 1 and 3 wherein said transfer comprises:
   changing the state of said subscriber data in said first HLR from active;
   copying said subscriber data from said first to said second HLR;
   deleting said subscriber data from said first HLR; and
   changing the state of said subscriber data in said second HLR to active.

7. A method as claimed in claim 1 wherein said HLR nodes are arranged into a mated pair such that said active subscriber data is distributed across said nodes and wherein each node comprises a diversion function such that any of a subscriber data update and a subscriber request transaction addressed for a subscriber identity arriving at one said HLR node where the subscriber data is not active is forwarded to the other said HLR node.

8. A method as claimed in claim 7 wherein said transfer comprises the steps of:
   disable said subscriber data in said first node;
   copy said subscriber data from said first node to said second node;
   enable said subscriber data in said second node.

9. A method as claimed in claim 8 wherein said disable step comprises changing the state of said subscriber data in said first node from active to standby.

10. A method as claimed in claim 8 wherein said enable step comprises changing the state of said subscriber data in said second node from standby to active.

11. A method as claimed in claim 7 wherein subscriber data update and request transactions addressed for said first HLR are re-routed by said network to said second HLR.

12. A computer program stored on a machine readable medium which is arranged to implement a method of migrating subscriber data associated with a plurality of subscriber identities from a first Home Location Register (HLR) node to a second HLR node, said HLR nodes being arranged such that subscriber data is distributed between said nodes, each node supporting some subscriber data as active data and some subscriber data as standby data, said standby data of each node corresponding to some active subscriber data of the other node, said nodes being connected by a fixed network, wherein, for each subscriber data associated with a subscriber identity or a small group of subscriber identities to be migrated from said first HLR node to said second HLR node, the method comprises the steps of:
   A. at said first HLR node, changing a state of said subscriber data from active to standby; and
   B. transferring said subscriber data from said first HLR node to said second HLR node by way of changing at said second HLR node the state of the subscriber data from standby to active,
   wherein active data of the first HLR node which is not to be migrated or is to be migrated but has not yet been migrated is maintained as active while said subscriber data currently being migrated is processed according to steps A and B.

13. A computer program stored on a machine readable medium which is arranged to implement a method of migrating subscriber data associated with a plurality of subscriber identifies from a first Home Location Register (HLR) node to a second HLR node, said HLR nodes being connected by a fixed network, the method comprising the steps of:
   copying the subscriber data associated with said plurality of subscriber identities from said first HLR node to said second HLR node;
   and, for each subscriber data associated with a subscriber identity or a small group of subscriber identities to be migrated from said first HLR node to said second HLR node, the method comprises the further steps of:
   A. at said first HLR node, changing a state of said subscriber data from active to standby; and
   B. transferring said subscriber data from said first HLR node to said second HLR node by way of changing at said second HLR node the state of the subscriber data from standby to active,
   wherein active data of the first HLR node which is not to be migrated or is to be migrated but has not yet been migrated is maintained as active while said subscriber data currently being migrated is processed according to steps A and B.

14. A computer program stored on a machine readable medium which is arranged to implement a method of migrating subscriber data associated with a plurality of subscriber identities from a first Home Location Register (HLR) node to a second HLR node, said HLR nodes being connected by a fixed network, for each subscriber data associated with a subscriber identity or a small group of subscriber identities to be migrated from said first HLR node to said second HLR node, the method comprises the steps of:
   A. at said first HLR node, changing a state of said subscriber data from active to standby;
   B. copying from said first HLR node said subscriber data associated with said subscriber identity or said small group of subscriber identities to said second HLR node; and
   C. at said second HLR node, changing the state of said subscriber data from standby to active,
   wherein active data of the first HLR node which is not to be migrated or is to be migrated but has not yet been migrated is maintained as active while said subscriber data currently being migrated is processed according to steps A to C.

15. A computer program implemented method as claimed in any one of claims 12, 13 or 14 further comprising the step of:
   implementing a diversion function such that any one of a subscriber data update and a subscriber request transaction addressed for a subscriber identity arriving at one said node where the subscriber data is not active is forwarded to the other node.

* * * * *